United States Patent [19]

Kouno et al.

[11] Patent Number: 5,009,490
[45] Date of Patent: Apr. 23, 1991

[54] PHOTO-CONDUCTIVE LIQUID CRYSTAL LIGHT VALVE

[75] Inventors: Tomomitsu Kouno; Hideki Hatano; Takashi Yamaji; Sakashi Ootaki; Masami Nishida, all of Saitama, Japan

[73] Assignee: Pioneer Electronic Corp., Tokyo, Japan

[21] Appl. No.: 363,825

[22] Filed: Jun. 9, 1989

[30] Foreign Application Priority Data

Nov. 11, 1988 [JP] Japan .................. 63-284970

[51] Int. Cl.$^5$ .................. G02F 1/13; G04B 19/30
[52] U.S. Cl. ..................... 350/342; 350/345
[58] Field of Search ............ 350/342, 341, 345, 331, 350/342

[56] References Cited

U.S. PATENT DOCUMENTS 4,208,869  6/1980  Hanaoka .................. 350/345
4,580,877  4/1986  Washo ..................... 350/345

FOREIGN PATENT DOCUMENTS 3531736  3/1986  Fed. Rep. of Germany ...... 350/345
0111368  8/1979  Japan ........................ 350/342

OTHER PUBLICATIONS

"Liquid Crystal Display"—Hornberger—IBM Technical Disclosure Bulletin—vol. 12, No. 10, Mar. 1970, pp. 1697-1698.

*Primary Examiner*—Rolf Hille
*Assistant Examiner*—S. V. Clark
*Attorney, Agent, or Firm*—Sughrue, Mion, Zinn, Macpeak & Seas

[57] ABSTRACT

A photo-conductive liquid crystal display in which the liquid crystal light valve and the electroluminescence element are disposed integrally with each other. The photo-conductive liquid crystal light valve is arranged such that a pair of transparent electrodes are disposed on the outside of a lamination of a photo-conductive layer and a liquid crystal layer, and an electroluminescence element is disposed on the outside of the transparent electrode which is disposed on the writing side of the device.

2 Claims, 2 Drawing Sheets

PHOTO-CONDUCTIVE LIQUID CRYSTAL LIGHT VALVE

BACKGROUND OF THE INVENTION

1. Field of the Invention

The present invention relates to a photo-conductive liquid crystal light valve for use in a projection type liquid crystal display device.

2. Background

The photo-conductive liquid crystal light valve is arranged such that a pair of transparent electrodes are disposed on the outside of a lamination structure of a photo-conductive layer, a liquid crystal layer laminated with a light reflection layer is interposed therebetween, and an AC voltage is applied between the pair of transparent electrodes. In this arrangement, when the element is irradiated with light from its writing side, the resistance of a portion of the photo-conductive layer irradiated with the light is reduced so that a voltage is applied to a portion of the liquid crystal layer corresponding to that portion of the photo-conductive layer and an image is written into the element.

As means for writing an image into such a photo-conductive liquid crystal light valve, known is, for example, an optical fiber tube constituted by a CRT (cathode-ray tube) and optical fibers connected to the CRT for leading an image displayed on the CRT to the photo-conductive liquid crystal light valve. FIG. 1 shows an example of the conventional projection type liquid crystal display device using such an optical fiber tube of the type as described above. As shown in FIG. 1, an image displayed on a CRT of an optical fiber tube 2 is written into a photo-conductive layer of a liquid crystal light valve 1 through optical fibers. Light emitted from a light source 3 enters into a polarizing beam splitter 6 through a mirror 4 and a condenser lens 5. P-polarization components of the incident light are passed through the polarizing beam splitter 6 as they are, and, to the contrary. S-polarization components of the light are perpendicularly deflected by the polarizing beam splitter 6 so as to enter the liquid crystal light valve 1.

In this case, if an image is being drawn in a liquid crystal layer of the liquid crystal light valve 1, the light reflected from the liquid crystal light valve 1 locally contains P-polarization components in accordance with the concentration of the image of the liquid crystal layer. Then, only the P-polarization components in the reflected light are passed through the polarizing beam splitter 6 as they are, so that an image corresponding to the P-polarization components is projected onto a screen 8 through a projection lens 7.

Thus, as means for writing an image into the photo-conductive liquid crystal light valve 1, the optical fiber tube 2 has been conventionally used. In the case of using the optical fiber tube 2, however, there has been a disadvantage in that the volume of space occupied by the optical fiber tube 2 is large because the CRT is large in depth and therefore the optical fiber tube 2 is disadvantageous with respect to size.

Further, as means for writing an image into the photo-conductive liquid crystal light valve 1, there is a two-dimensional scanner using laser light. In this case, there is a disadvantage in that a large amount of space is required and the structure is complicated and expensive.

SUMMARY OF THE INVENTION

It is therefore an object of the present invention to eliminate the foregoing disadvantages in the prior art.

It is another object of the present invention to provide a photo-conductive liquid crystal light valve in which an image writing means is integrally provided so as to considerably reduce the space occupied by the projection liquid crystal display device so as to simplify the display device.

The photo-conductive liquid crystal light valve according to the present invention is arranged such that a pair of transparent electrodes are disposed on the outside of a lamination of a photo-conductive layer and a liquid crystal layer, and an electro-luminescence element (hereinafter, simply referred to as "an EL element") is disposed on the outside of a writing-side one of the pairs of transparent electrodes.

BRIEF DESCRIPTION OF THE DRAWINGS

These and other features, objects and advantages of the present invention will be apparent from the following detailed description with reference to the accompanying drawings, in which.

DETAILED DESCRIPTION OF THE PREFERRED EMBODIMENT

An embodiment of the photo-conductive liquid crystal light valve according to the present invention will be described in detail hereunder with reference to the accompanying drawings.

Figure 2:
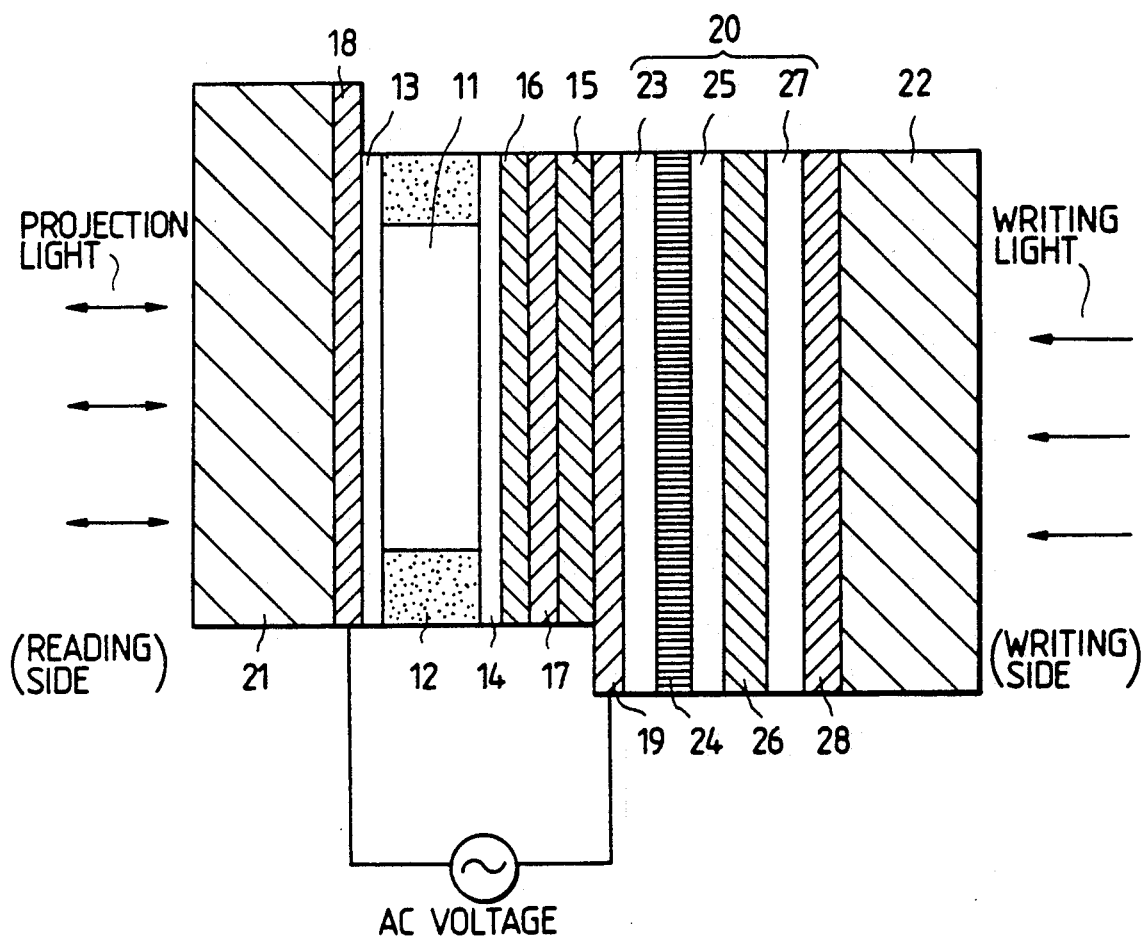
FIG. 2 is a section showing the structure of an embodiment of the present invention.

FIG. 2 is a section showing an embodiment of the present invention. Referring to FIG. 2 a spacer 12 is disposed so as to surround a liquid crystal layer 11, and orientation films 13 and 14 are disposed on opposite surfaces of the liquid crystal layer 11. The liquid crystal layer 11 and a photo-conductive film 15 are laminated with a light reflection film 16 and a light absorption film 17 interposed therebetween. The light reflection film 16 is provided for absorbing projected light entering from the reading side and the light absorption film 17 is provided for absorbing leakage light leaking from the light reflection film 16. Transparent photo-conductive films 18 and 19 acting as transparent electrodes are disposed on the outside of the liquid crystal layer 11 and the photo-conductive film 15, respectively, and an EL element 20 is disposed on the outside of the writing-side transparent photo-conductive film 19, the whole lamination structure being sealed with glass substrates 21 and 22. An AC voltage is applied across the transparent photo-conductive films 18 and 19.

The EL element 20 is constituted by a transparent insulation layer 23, a transparent electrode 24, a transparent insulation layer 25, a zinc sulfide (ZnS) layer 26, a transparent insulation layer 27, and a metal electrode 28 which are laminated on the writing-side transparent photo-conductive layer 19 in the stated order. In the EL element 20, the transparent electrode 24 is constituted by a plurality of strip-like electrodes disposed so as to extend in parallel to each other in the X-direction, and, on the contrary, the metal electrode 28 is constituted by a plurality of strip-like electrodes disposed so as to extend in parallel to each other in the Y-direction.

Figure 1:
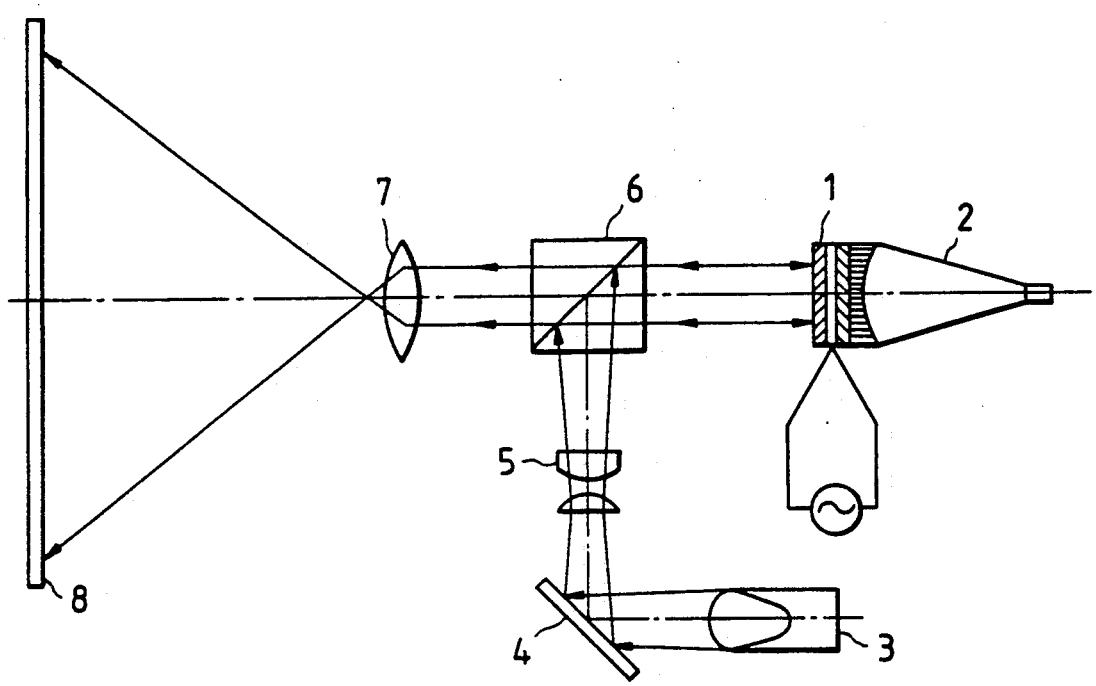
FIG. 1 is a diagram showing an example of the conventional projection liquid crystal display device using an optical fiber tube as the image writing means.
Figure 3:
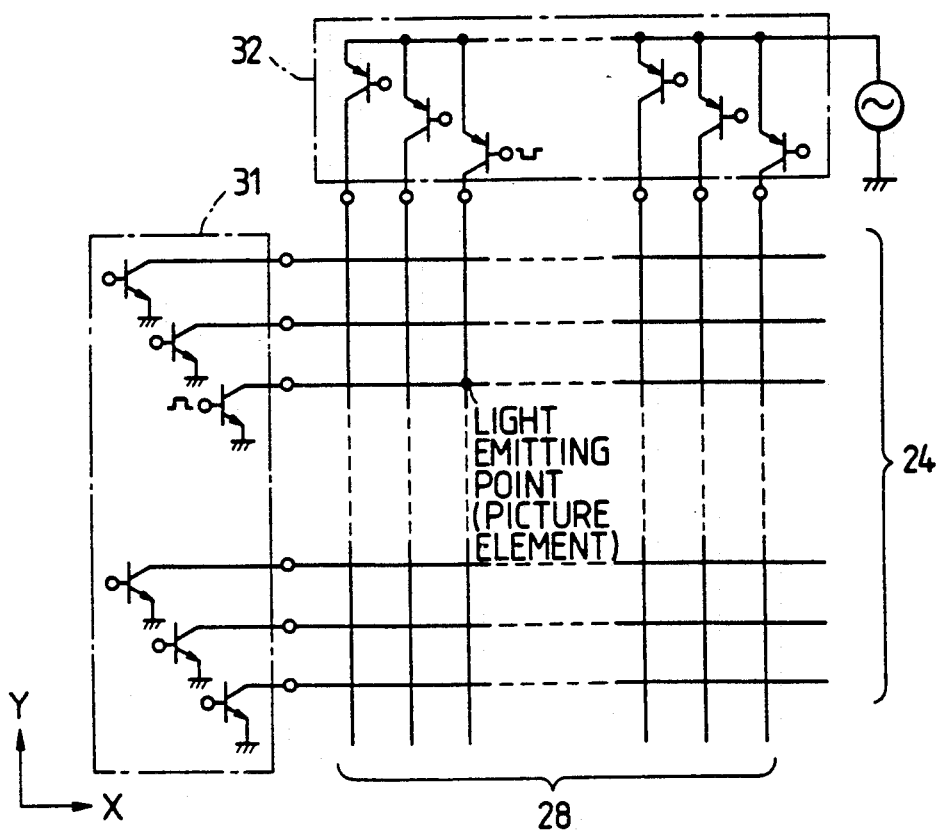
FIG. 3 is a diagram showing the configuration of the drive portion for driving the electrodes constituting an X-Y matrix.

FIG. 3 shows an example of the configuration of the X- and Y-direction electrodes and drive circuits therefor. In the drawing, the X-direction electrodes constituting the transparent electrode 24 and the Y-direction electrodes constituting the metal electrode 28 are disposed in matrix and each of the intersections of the electrodes corresponds to one picture element. One of the X-direction electrodes 24 and one of the Y-direction electrodes 28 forming an intersection corresponding to a desired picture element are selected by drive circuits 31 and 32, and an AC voltage is applied across the thus selected electrodes so that a portion of the ZnS layer 26 disposed between the X- and Y-direction electrodes, corresponding to the intersection of the selected electrodes emits light. An image is written onto the photo-conductive film 15 of the photo-conductive liquid crystal light valve by the thus emitted light.

Thus, the EL element 20 is disposed on the outside of the writing-side transparent photo-conductive film 19 so that an image is written into the photo-conductive film 15 of the liquid crystal light valve by the EL element 20. Thus, the liquid crystal light valve and the EL element 20 are provided integrally with each other, that is, the optical writing means is included in one element. Accordingly, if the photo-conductive liquid crystal light valve according to the present invention is applied to a projection type liquid crystal display device, the space occupied by the display device can be considerably reduced and contribution can be made to simplification of the arrangement of the display device.

As described above, the photo-conductive liquid crystal light valve according to the present invention is arranged such that the EL element for performing optical writing is disposed on the outside of the writing-side electrode of the pair of electrodes disposed on the outside of the photo-conductive layer and the liquid crystal layer. Therefore, the space occupied by the whole display device can be considerably reduced and contribution can be made to simplification of the arrangement of the display device.

What is claimed is:

1. A photo-conductive liquid crystal light valve comprising:

a lamination of a photo-conductive layer and a liquid crystal layer;

a pair of transparent electrodes, one electrode of said pair of electrodes being disposed on the outside of said photo-conductive layer and another electrode of said pair of electrodes being disposed on the outside of said liquid crystal layer respectively; and an electroluminescence element disposed on the outside of one of said electrodes of said pair of electrodes, said one electrode being on a writing side, said electroluminescence element includes a first transparent insulation layer, a transparent electrode, a second transparent insulation layer, a zinc sulfide layer, a third transparent insulation layer, and a metal electrode which are laminated in the stated order.

2. A photo-conductive liquid crystal light valve according to claim 1, wherein said transparent electrode included within said electroluminescence element is made by a plurality of strip-like electrodes and said metal electrode is made by a plurality of strip-like electrodes.

* * * * *